United States Patent
Yamada

(10) Patent No.: US 6,909,508 B2
(45) Date of Patent: Jun. 21, 2005

(54) MEASURING OPTICAL WAVEFORMS

(75) Inventor: Norihide Yamada, Kokubunji (JP)

(73) Assignee: Agilent Technologies, Inc., Palo Alto, CA (US)

(*) Notice: Subject to any disclaimer, the term of this patent is extended or adjusted under 35 U.S.C. 154(b) by 286 days.

(21) Appl. No.: 10/393,850

(22) Filed: Mar. 21, 2003

(65) Prior Publication Data

US 2003/0185577 A1 Oct. 2, 2003

(30) Foreign Application Priority Data

Mar. 28, 2002 (JP) ........................................ 2002-091809

(51) Int. Cl.$^7$ ............................. G01B 9/02; H04B 10/06
(52) U.S. Cl. ........................................ 356/484; 398/204
(58) Field of Search ................................ 356/450, 484; 398/204

(56) References Cited

U.S. PATENT DOCUMENTS

| 6,456,380 B1 | 9/2002 | Naganuma |
| 6,483,287 B2 | 11/2002 | Otsubo et al. |
| 2002/0024689 A1 | 2/2002 | Shirane et al. |
| 2002/0175275 A1 | 11/2002 | Yamada et al. |
| 2003/0016347 A1 | 1/2003 | Ohta |

Primary Examiner—Gregory J. Toatley, Jr.
Assistant Examiner—Michael A. Lyons

(57) ABSTRACT

Apparatus and methods of measuring optical waveforms are described. In one aspect, an optical waveform measurement apparatus includes a light wave source, a mixer, a down converter, and a controller. The light wave source is operable to provide an adjustable frequency light wave with a frequency that is adjustable over a target frequency range. The mixer is operable to mix a target modulated optical signal with the adjustable frequency light wave to obtain a mixed signal. The frequency down converter is operable to down convert the mixed signal to obtain a down-converted signal. The controller is operable to extract from the down-converted signal amplitude and phase information relating to the target modulated optical signal and to cause the light wave source to incrementally adjust the frequency of the adjustable frequency light wave over the target frequency range.

23 Claims, 4 Drawing Sheets

MEASURING OPTICAL WAVEFORMS

CROSS-REFERENCE TO RELATED APPLICATIONS

Under 35 U.S.C. § 119 this application claims the benefit of co-pending Japanese Patent Application No. 2002-091809, which was filed Mar. 28, 2002, and is incorporated herein by reference.

BACKGROUND

The goal of optical waveform measurement is to measure the variations of a waveform in time. Optical waveforms may be characterized in the time domain by an intensity and a phase. Optical waveforms also may be characterized in the frequency domain by taking the Fourier transform of the time domain representation. In the frequency domain, an optical waveform may be characterized by a spectral intensity (or spectrum) and a spectral phase. The derivative of the spectral phase with respect to frequency may be computed to obtain the "group delay," which represents the delay in the arrival time of a particular slice of the spectrum at a frequency at a particular location. If the group delay is constant, all frequencies arrive at the same time, and the pulse is as short as possible.

Many different techniques for measuring optical waveforms have been proposed. If the waveform variations are sufficiently slow, a waveform may be measured directly using electronic equipment, such as oscilloscopes, photodiodes, and streak cameras. For faster waveform variations, intensity autocorrelation waveform measuring techniques may be used to determine some aspects of an optical waveform. Such techniques involve crossing a waveform and a delayed replica of the waveform in a nonlinear medium, such as a second-harmonic-generation crystal or a two-photon absorber, and detecting the output optical energy as a function of delay. Time-frequency domain optical waveform measurement techniques also have been proposed. In these techniques, the intensity variations over time are measured for different spectral slices of an optical waveform. More complex waveform measurement methods, such as frequency-resolved optical gating techniques, also have been proposed. In these techniques, the spectrogram of an optical waveform pulse is measured. The gating occurs in time, rather than frequency, followed by measurement of the spectrum of each time slice. Typically, the optical waveform is gated with itself. The resulting spectrogram is a spectrum of the autocorrelation.

SUMMARY

The invention features apparatus and methods of measuring optical waveforms.

In one aspect, the invention features an optical waveform measurement apparatus that includes a light wave source, a mixer, a down converter, and a controller. The light wave source is operable to provide an adjustable frequency light wave with a frequency that is adjustable over a target frequency range. The mixer is operable to mix a target modulated optical signal with the adjustable frequency light wave to obtain a mixed signal. The frequency down converter is operable to down convert the mixed signal to obtain a down-converted signal. The controller is operable to extract from the down-converted signal amplitude and phase information relating to the target modulated optical signal and to incrementally adjust the frequency of the adjustable frequency light wave over the target frequency range.

In another aspect, the invention features an optical waveform measurement method. In accordance with this inventive method, an adjustable frequency light wave is provided. A target modulated optical signal is mixed with the adjustable frequency light wave to obtain a mixed signal. The mixed signal is down converted to obtain a down-converted signal. Amplitude and phase information relating to the target modulated optical signal is extracted from the down-converted signal. The frequency of the adjustable frequency light wave is incrementally adjusted over a target frequency range. The steps of mixing, down converting, and extracting are repeated after each frequency adjustment of the adjustable frequency light wave.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
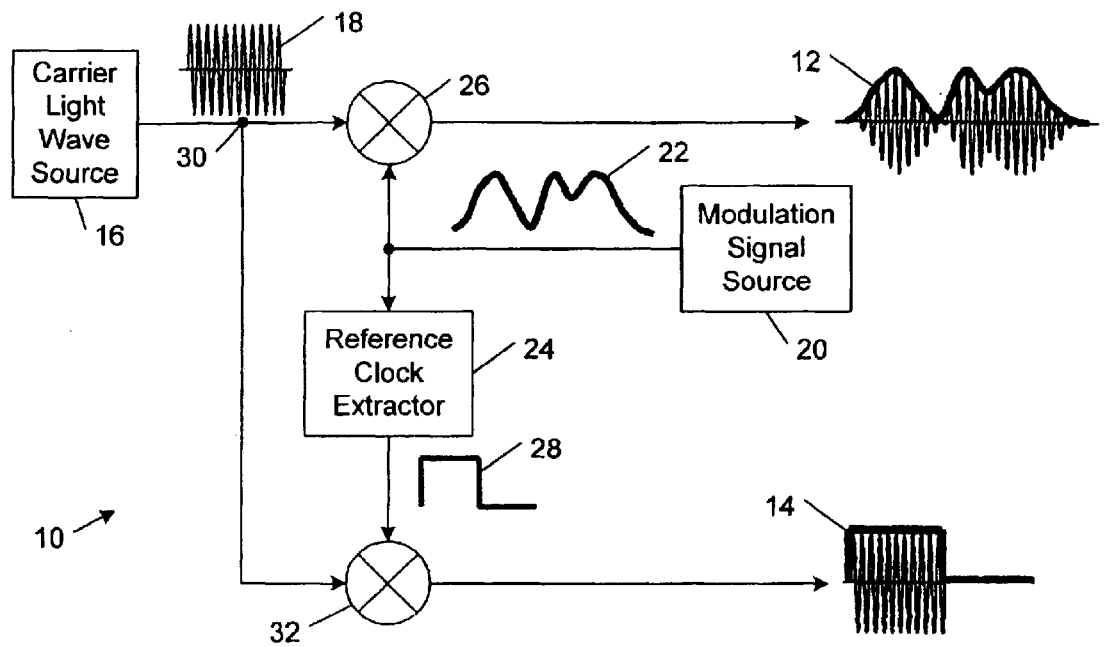
FIG. 1 is diagrammatic view of an apparatus for generating a target modulated optical signal and a reference clock optical signal.

FIG. 1 shows an embodiment of an apparatus 10 for generating a target modulated optical signal 12 and a reference clock optical signal 14 that includes a source 16 of a carrier light wave 18, a source 20 of a modulation signal 22, and a reference clock extractor 24. In the illustrated embodiment, carrier light wave source 16 is a laser-based local oscillator that generates an unmodulated carrier light wave that is characterized by an angular frequency of $\omega_l$ and a phase $\theta_l$. Modulation signal source 20 is implemented in the form of any one of a wide variety of known modulation signal sources. Modulation signal 22 (s(t)) is characterized by a DC amplitude component S[0] and N harmonic components each characterized by a respective harmonic angular frequency $k\omega_r$ and respective amplitude S[k] and phase $\theta[k]$ components, where k has an integer value from 1 to N. Modulation signal 22 may be expressed as follows:

$$s(t) = S[0] + \sum_{k=1}^{N} S[k] \cdot \cos(k\omega_r t + \theta[k]) \quad (1)$$

where $\omega_r$ is the fundamental harmonic frequency (or repeating frequency). Accordingly, modulation signal s(t) includes multiple harmonic components extending from $\omega_r$ to $\omega_{max} = N\omega_r$. The modulation signal 22 is mixed with the carrier light wave 18 in a mixer (or modulator) 26 to obtain target modulated optical signal 12 (f(t)), which may be expressed as follows:

$$f(t) = \cos(\omega_l t + \theta[k]) \cdot s(t) \quad (2)$$

Reference clock extractor 24 generates a reference clock signal 28 from the modulation signal 22 (s(t)) using any one of a wide variety of known square wave signal processing techniques. For example, modulation signal 22 (s(t)) may be made square using a nonlinear electronic device (e.g., a diode), a bandpass filter, or a phase-locked loop. Reference clock signal 28 (s'(t)) is a repetitive signal that is synchronized with modulation signal 22 (s(t)) and is characterized by an angular frequency $\omega_r$. A portion of carrier light wave 16 is split by an optical splitter 30 and is mixed with reference clock signal 28 (s'(t)) by a modulator 32 (e.g., a known high-speed lithium niobate optical modulator) to obtain reference clock optical signal 14 (f'(t)).

Figure 2:
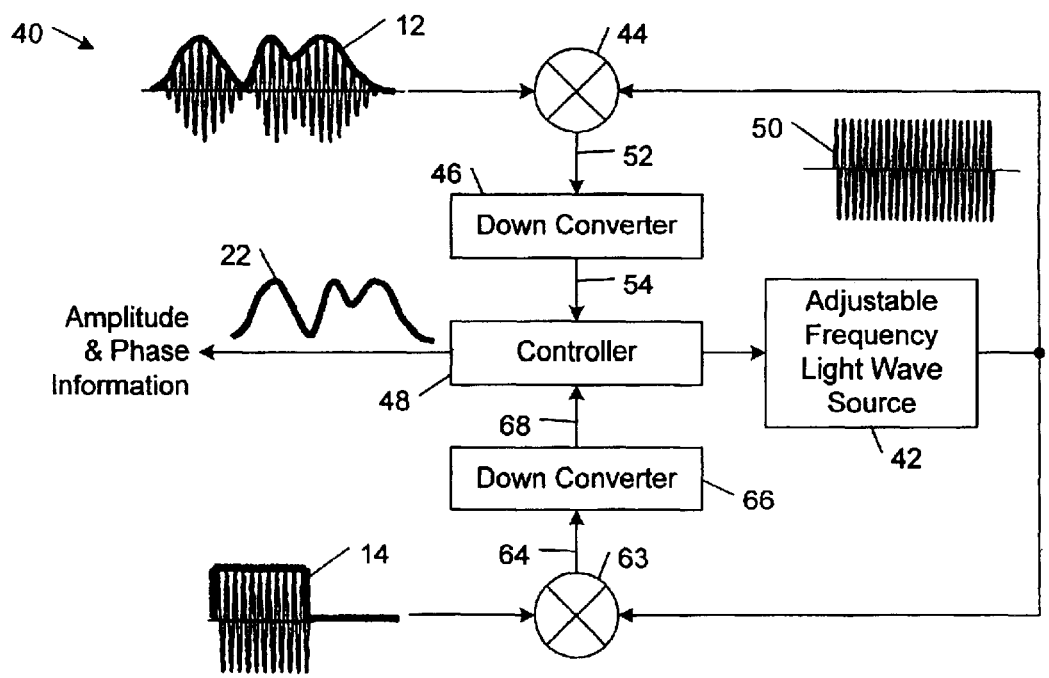
FIG. 2 is a diagrammatic view of an apparatus for measuring a waveform of a target modulated optical signal.

FIG. 2 shows an embodiment of an apparatus 40 for measuring the waveform of target modulated optical signal 12 (f(t)) includes an adjustable frequency light wave source 42, an optical mixer 44, a down converter 46, and a controller 48. Light wave source 42 is implemented in the form of any one of a wide variety of known laser-based local oscillators (e.g., a known variable-wavelength laser) that generates an unmodulated adjustable frequency light wave 50 that is characterized by an angular frequency $\omega_m$ and a phase $\theta_m$. Mixer 44 may be a known heterodyne mixer that is implemented by a nonlinear optical device that mixes target modulated optical signal 12 and adjustable frequency light wave 50 to obtain a mixed signal 52 (g(t)), which may be expressed as follows:

$$g(t) = \cos(\omega_m t + \theta_m) f(t) = \cos(\omega_m t + \theta_m) \cos(\omega_l t + \theta_l) s(t) \quad (3)$$

Mixed signal 52 may be rewritten as:

$$g(t) = \frac{1}{2}[\cos(\omega_s t + \theta_s) + \cos(\omega_d t + \theta_d)] \cdot s(t) \quad (4)$$

where $\omega_d = \omega_m - \omega_l$, $\omega_s = \omega_m + \omega_l$, $\theta_d = \theta_m - \theta_l$, and $\theta_s = \theta_m + \theta_l$. In the illustrated embodiment, the various angular frequencies are related as follows:

$$\omega_r < \omega_d < \omega_{max} << \omega_l < \omega_m \quad (5)$$

Figure 3:
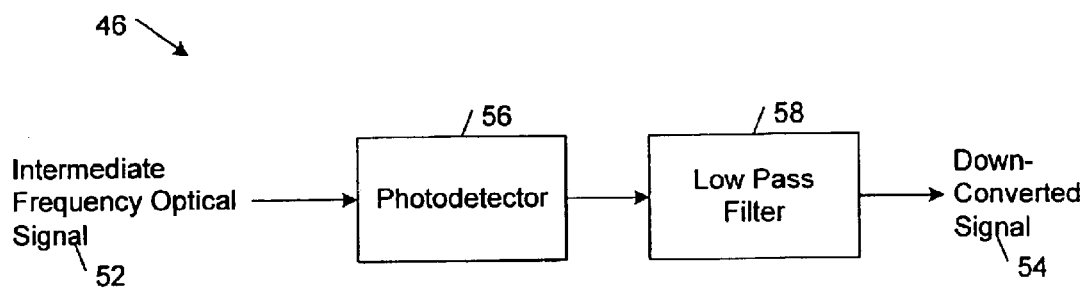
FIG. 3 is a block diagram of an exemplary down converter for the optical waveform measurement apparatus of FIG. 2.

Mixed signal 52 (g(t)) is down-converted by down converter 46 to obtain a down-converted signal 54 (h(t)). In the example shown in FIG. 3, down converter 46 is implemented as a heterodyne detection circuit that includes a photodetector 56 and a low pass filter 58. Down converter 46 selectively passes the low-frequency components of mixed signal 52. Down converter 46 is characterized by a low-frequency passband with an angular frequency bandwidth of $\Delta\omega$. In some embodiments, the passband of down converter 46 is narrower than the difference $\omega_d$ between the angular frequency $\omega_l$ of the carrier light wave 18 of the target modulated optical signal 12 and the angular frequency $\omega_m$ of the adjustable frequency light wave 50 (i.e., $\Delta\omega < \omega_d$). The resulting down-converted signal 54 may be expressed as follows:

$$h(t) = \sum_{k=N_L}^{N_H} \frac{1}{4} S[k] \cos((k\omega_r - \omega_d) \cdot t - \theta_d + \theta[k]) \quad (6)$$

where the angular frequency range of h(t) is constrained as follows:

$$\omega_d - \Delta\omega < N_L \omega_r \leq k\omega_r \leq N_H \omega_r < \omega_d + \Delta\omega \quad (7)$$

Figure 4:
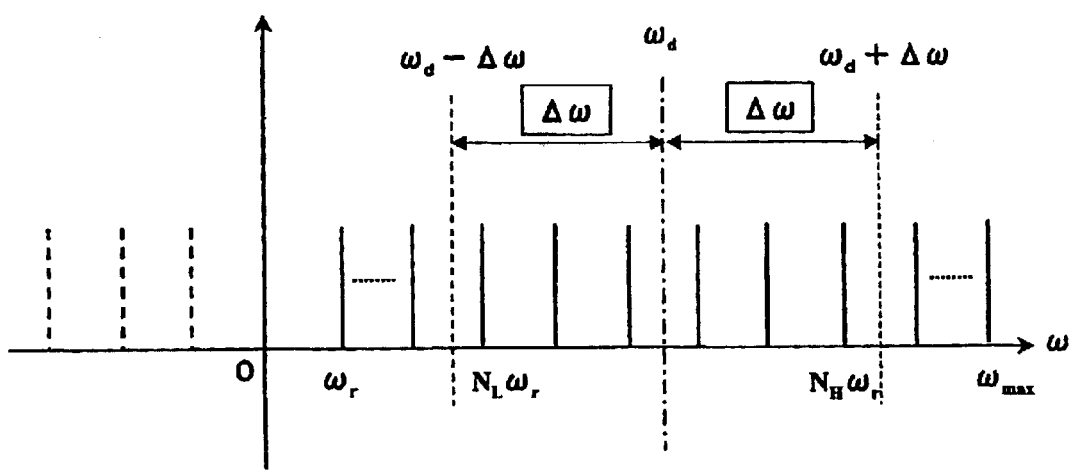
FIG. 4 is an exemplary frequency-domain plot of a target modulated optical signal.

The angular frequency relationships of Equation (7) are illustrated graphically in FIG. 4. In one exemplary embodiment, $\Delta\omega$ is on the order of about 1 GHz, $\omega_r$ is on the order of about a few MHz, $\omega_{max}$ is on the order of about 1 THz, and $\omega_l$ and $\omega_m$ are on the order of about 200 THz. In some embodiments, $\omega_r$ is less than or equal to $2\Delta\omega$.

As seen from Equation (6), down-converted signal 54 (h(t)) includes all of the amplitude and phase components of modulation signal 22 (s(t)) between the angular frequencies $N_L \omega_r$ and $N_H \omega_r$. Therefore, in order to obtain all of the amplitude and frequency information for modulation signal 22 (s(t)) between $\omega_r$ and $\omega_{max} = N\omega_r$, $\omega_m$ should be swept over an angular frequency range encompassing angular frequencies from about $\omega_l + \omega_r$ to about $\omega_l + N\omega_r$ such that $\omega_d$ is swept over the angular frequency range from about $\omega_r$ to about $\omega_{max}$. In some embodiments, the down-converted signal 54 (h(t)) is measured, while $\omega_m$ (and hence $\omega_d$) is adjusted in increments of $2\Delta\omega$ or less.

Figure 5:
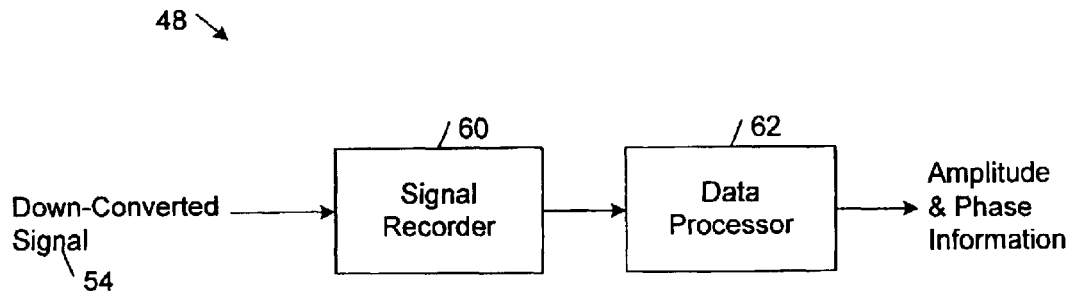
FIG. 5 is a block diagram of an exemplary controller for the optical waveform measurement apparatus of FIG. 2.

As shown in FIG. 5, in some embodiments, controller 48 includes a signal recorder 60 and a data processor 62. The down-converted signal 54 (h(t)) is measured and recorded by controller 48. The signal measurements are synchronized with the reference clock optical signal 14. Data processor 62 may compute the amplitude and phase components of h(t) by computing Fourier transforms of the recorded data signals as follows:

$$\int_0^T h(t) \cos(k\omega_r - \omega_d) t \cdot dt \quad (8)$$

$$\int_0^T h(t) \sin(k\omega_r - \omega_d) t \cdot dt \quad (9)$$

In this way, the amplitude components S[k] and the phase components $\theta[k] - \theta_d$ may be obtained. In some embodiments, the integration period, T, is selected so that $k\omega_r T$ and $\omega_d T$ are integral multiples of $2\pi$, which allows errors to be reduced.

In order to obtain values for the phase components $\theta[k]$ of the target modulated optical signal 12, the phase component values for $\theta_d$ are computed. In the embodiment shown in FIG. 2, the phase component values $\theta_d$ are determined by mixing the reference clock optical signal 14 with adjustable frequency light wave 50 in a mixer 63 to obtain a mixed signal 64 (g'(t)), which may be expressed as follows:

$$g'(t) = \cos(\omega_m t + \theta_m) f'(t) = \cos(\omega_m t + \theta_m) \cos(\omega_l t + \theta_l) s'(t) \quad (10)$$

where f'(t) is the reference clock optical signal 14 and s'(t) is the reference clock signal 28. Mixed signal 64 may be rewritten as:

$$g'(t) = \frac{1}{2}[\cos(\omega_s t + \theta_s) + \cos(\omega_d t + \theta_d)] \cdot s'(t) \qquad (11)$$

where $\omega_d = \omega_m - \omega_l$, $\omega_s = \omega_m + \omega_l$, $\theta_d = \theta_m - \theta_l$, and $\theta_s = \theta_m + \theta_l$. In the illustrated embodiment, the various angular frequencies are related as indicated in Equation (7).

Mixed signal 64 (g'(t)) is down-converted by down converter 66 to obtain a down-converted signal 68 (h'(t)). In one embodiment, down converter 66 may be implemented as a known heterodyne detection circuit that includes a photodetector and a low pass filter. Down converter 66 selectively passes the low-frequency components of mixed signal 64. Down converter 66 is characterized by a low-frequency passband with an angular frequency bandwidth of $\Delta\omega$. In some embodiments, the passband of down converter 66 is smaller than the difference between the angular frequency of the carrier light wave 18 of the reference clock optical signal 14 and the angular frequency of the adjustable frequency light wave 50 (i.e., $\Delta\omega < \omega_d$) The resulting down-converted signal 68 may be expressed as follows:

$$h'(t) = \sum_{k=N_L}^{N_H} \frac{1}{4} S'[k]\cos((k\omega_r - \omega_d) \cdot t - \theta_d + \theta'[k]) \qquad (12)$$

As seen from equation (12), down-converted signal 68 (h'(t)) includes all of the amplitude and phase components of reference clock optical signal 14 (s'(t)) between the angular frequencies $N_L \omega_r$ and $N_H \omega_r$. Therefore, in order to obtain all of the amplitude and frequency information for reference clock optical signal 14 (s'(t)) between $\omega_r$ and $\omega_{max} = N\omega_r$, $\omega_m$ should be swept over an angular frequency range encompassing angular frequencies from about $\omega_l + \omega_r$ to about $\omega_l + N\omega_r$ such that $\omega_d$ is swept over the angular frequency range from about $\omega_r$ to about $\omega_{max}$. In some embodiments, the down-converted signal 68 (h'(t)) is measured, while $\omega_m$ (and hence $\omega_d$) is adjusted in increments of $2\Delta\omega$ or less.

The down-converted signal 54 (h'(t)) is measured and recorded by controller 48. The signal measurements are synchronized with the reference clock optical signal 14. Data processor 62 may compute the amplitude and phase components of h'(t) by computing Fourier transforms of the recorded data signals as follows:

$$\int_0^T h'(t)\cos(k\omega_r - \omega_d)t \cdot dt \qquad (13)$$

$$\int_0^T h'(t)\sin(k\omega_r - \omega_d)t \cdot dt \qquad (14)$$

In this way, the amplitude components S'[k] and the phase components $\theta'[k] - \theta_d$ may be obtained. In some embodiments, the integration period, T, is selected so that $k\omega_r T$ and $\omega_d T$ are integral multiples of $2\pi$, which allows errors to be reduced.

In some implementations, the resulting computed phase terms $\theta'[k]$ all will be zero or may be computed in advance by known binary analysis techniques. After all of the phase terms $\theta'[k]$ are determined, the values of $\theta_d$ may be computed for each angular frequency value. These values may then be used to obtain the corrected phase terms $\theta[k]$ for the target modulated optical signal 12.

In some embodiments, in the process of determining S[k], $\theta[k] - \theta_d$ and S'[k], $\theta[k] - \theta_d$, the values of k are constrained by the following condition:

$$|k\omega_r - \omega_d| < \Delta\omega \qquad (15)$$

Figure 6:
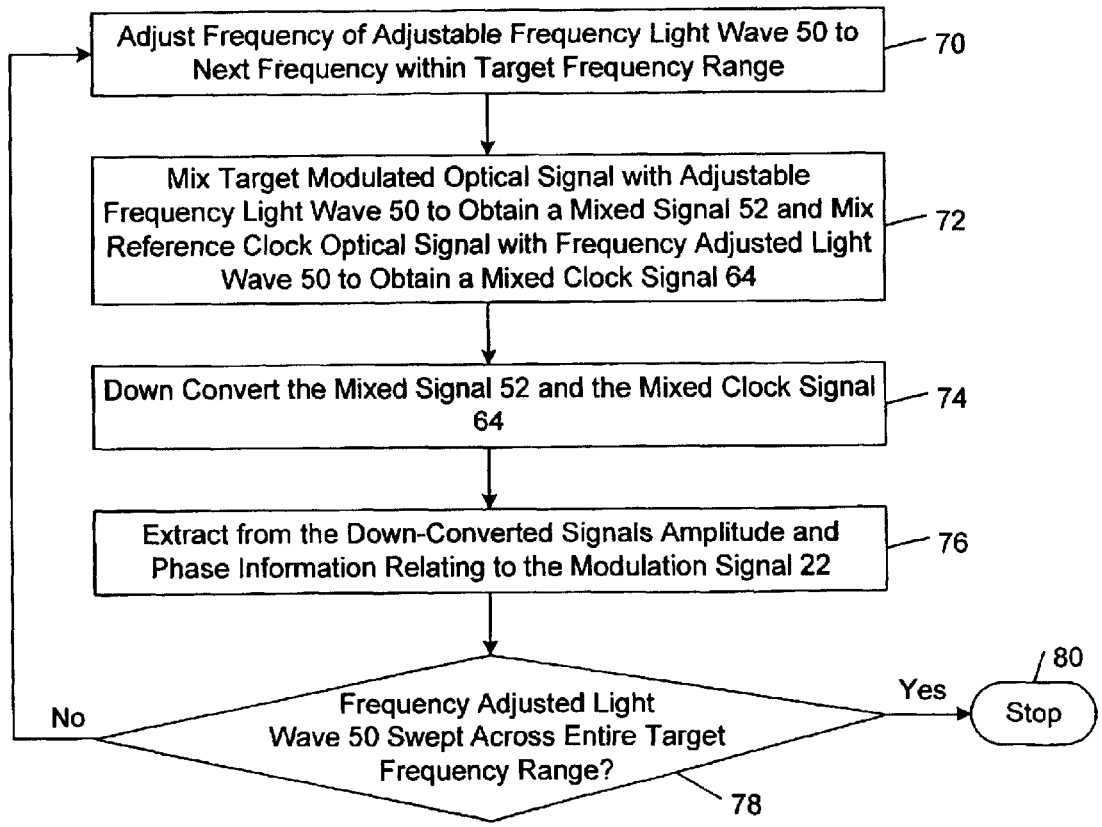
FIG. 6 is a flow diagram of a method of measuring an optical waveform.

Referring to FIG. 6, in some embodiments, optical waveform measurement apparatus 40 may be programmed to operate as follows. The frequency of the adjustable frequency light wave 50 is adjusted to the next frequency within the target frequency range (step 70). In some embodiments, controller 48 adjusts light wave source 42 to provide an adjustable frequency light wave 50 with an initial angular frequency of about $\omega_l + \omega_r$. The target modulated optical signal 12 is mixed with adjustable frequency light wave 50 to obtain mixed signal 52 and the reference clock optical signal is mixed with the adjustable frequency light wave 50 to obtain mixed clock signal 64 (step 72). The mixed signal 52 and the mixed clock signal 64 are down-converted (step 74). In some embodiments, the target modulated optical signal 12 and the adjustable frequency light wave 14 may be mixed and down-converted simultaneously. Amplitude and phase information relating to the modulation signal 22 is extracted from the down-converted signals 54, 68 (step 76). If the adjustable frequency light wave 50 has been swept across the entire target frequency range (step 78), the waveform measurement process is terminated (step 80). In some embodiments, the final frequency of adjustable frequency light wave 50 is equal to about $\omega_l + N\omega_r$. If the adjustable frequency light wave 50 has not been swept across the entire target frequency range (step 78), the process is repeated for the next frequency within the target frequency range (steps 70–76). In some embodiments, the frequency of the adjustable frequency light wave 50 is adjusted in increments of $2\Delta\omega$ or less.

Figure 7:
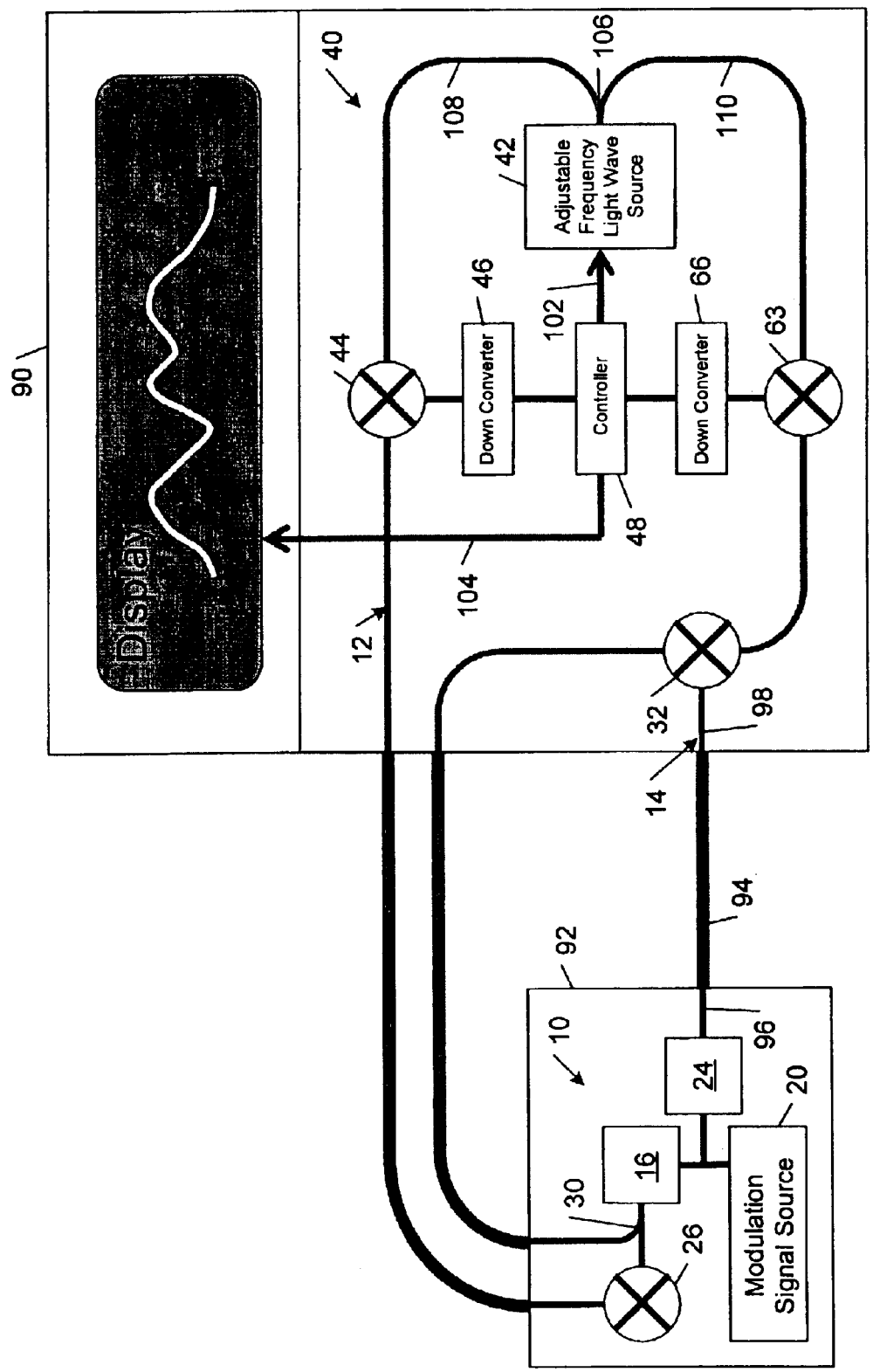
FIG. 7 is a block diagram of the waveform measuring apparatus of FIG. 2 incorporated into a sampling light oscilloscope that is coupled to evaluate and inspect temporal response characteristics of a light source system incorporating components of the modulated optical signal apparatus of FIG. 1.

Referring to FIG. 7, in one implementation, the waveform measuring apparatus 40 of FIG. 2 is incorporated into a sampling light oscilloscope 90 that is coupled to evaluate and inspect temporal response characteristics of a light source system 92 that incorporates components of the modulated optical signal apparatus 10 of FIG. 1. In this implementation, modulator 32 is incorporated within sampling light oscilloscope 90. Modulator 32 is coupled to optical splitter 30 and optical mixer 44 is coupled to mixer 26 by respective external optical transmission lines. The external optical transmission lines are optical fibers, and the optical transmission lines within sampling light oscilloscope 90 and light source system 92 are optical fibers or spatial optical connections. Modulator 32 is coupled to reference clock extractor by electrical connections. The external electrical connection 94 is an electrical cable and the internal electrical connections 96, 98 are circuit board electrical connections. Controller 48 is coupled to adjustable frequency light wave source 42 and a display 100 by respective control and data lines 102, 104. An optical divider 106 splits the adjustable frequency light wave 50, and respective optical transmission lines 108, 110 (e.g., optical fibers) carry the split light wave signals to mixers 44 and 63, respectively. In some implementations, reference clock extractor 24 may be incorporated in sampling light oscilloscope rather than in light source system 92.

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

What is claimed is:

1. An optical waveform measurement apparatus, comprising:

a light wave source operable to provide an adjustable frequency light wave with a frequency adjustable over a target frequency range;

a mixer operable to mix a target modulated optical signal with the adjustable frequency light wave to obtain a mixed signal;

a frequency down converter operable to down convert the mixed signal to obtain a down-converted signal; and a controller operable to extract from the down-converted signal amplitude and phase information relating to the target modulated optical signal and to incrementally adjust the frequency of the adjustable frequency light wave over the target frequency range.

2. The apparatus of claim 1, wherein the light wave source is a local oscillator.

3. The apparatus of claim 1, wherein the mixer is a heterodyne mixer.

4. The apparatus of claim 1, wherein the down converter comprises: a photodetector operable to generate an electrical data signal in response to the mixed signal; and a low pass filter operable to obtain the down-converted signal from the electrical data signal.

5. The apparatus of claim 1, wherein the controller is operable to extract the amplitude and phase information by Fourier transformation of the down-converted signal.

6. The apparatus of claim 1, wherein the target modulated optical signal corresponds to a carrier light wave modulated by a modulation signal characterized by a fundamental angular frequency, $\omega_r$.

7. The apparatus of claim 6, wherein the modulation signal is characterized by an angular frequency band that extends from $\omega_r$ to a maximum harmonic frequency, $\omega_{max}= N\cdot\omega_r$.

8. The apparatus of claim 7, wherein the carrier light wave is characterized by an angular frequency, $\omega_l$, and the controller is operable to adjust the frequency of the adjustable frequency light wave over a target frequency range encompassing angular frequencies from about $\omega_l+\omega_r$ to about $\omega_l+N\cdot\omega_r$.

9. The apparatus of claim 6, wherein the carrier light wave is characterized by an angular frequency that is substantially greater than $\omega_r$.

10. The apparatus of claim 1, wherein the controller is operable to cause the light wave source to adjust the frequency of the adjustable frequency light wave in increments less than or equal to $2\cdot\Delta\omega$, where $\Delta\omega$ is an angular frequency passband of the down converter.

11. The apparatus of claim 1, further comprising: a mixer operable to mix a reference clock optical signal with the adjustable frequency light wave to obtain a mixed clock signal; and a down converter operable to obtain a down-converted clock signal from the mixed clock signal; wherein the controller is operable to compute a phase correction factor based on the down-converted clock signal.

12. The apparatus of claim 11, further comprising a target modulated optical signal generator comprising a mixer operable to generate the target modulated optical signal by mixing a carrier light wave with a modulation signal, a clock signal extractor operable to obtain a reference clock signal from the modulation signal, and a mixer operable to mix the reference clock signal with the carrier light wave to generate a reference clock optical signal.

13. The apparatus of claim 12, wherein the reference clock optical signal is synchronized with the target modulated optical signal.

14. An optical waveform measurement method, comprising:

providing an adjustable frequency light wave;

mixing a target modulated optical signal with the adjustable frequency light wave to obtain a mixed signal;

down converting the mixed signal to obtain a down-converted signal;

extracting from the down-converted signal amplitude and phase information relating to the target modulated optical signal;

incrementally adjusting the frequency of the adjustable frequency light wave over a target frequency range; and repeating the steps of mixing, down converting, and extracting after each frequency adjustment of the adjustable frequency light wave.

15. The method of claim 14, wherein the amplitude and phase information is extracted by Fourier transformation of the down-converted signal.

16. The method of claim 14, wherein the target modulated optical signal corresponds to a carrier light wave modulated by a modulation signal characterized by a fundamental angular frequency, $\omega_r$.

17. The method of claim 16, wherein the modulation signal is characterized by an angular frequency band that extends from $\omega_r$ to a maximum harmonic frequency, $\omega_{max}= N\cdot\omega_r$.

18. The method of claim 17, wherein the carrier light wave is characterized by an angular frequency, $\omega_l$, and the frequency of the adjustable frequency light wave is adjusted over a target frequency range encompassing angular frequencies from about $\omega_l+\omega_r$ to about $\omega_l+N\cdot\omega_r$.

19. The method of claim 16, wherein the carrier light wave is characterized by an angular frequency that is substantially greater than $\omega_r$.

20. The method of claim 14, wherein the frequency of the adjustable frequency light wave is adjusted in increments less than or equal to $2\cdot\Delta\omega$, where $\Delta\omega$ is an angular frequency passband during down conversion of the mixed signal.

21. The method of claim 14, further comprising mixing a reference clock optical signal with the adjustable frequency light wave to obtain a mixed clock signal, obtaining a down-converted clock signal from the mixed clock signal, and computing a phase correction factor based on the down-converted clock signal.

22. The method of claim 21, further comprising generating the target modulated optical signal by mixing a carrier light wave with a modulation signal, obtaining a reference clock signal from the modulation signal, and mixing the reference clock signal with the carrier light wave to generate a reference clock optical signal.

23. The method of claim 22, wherein the reference clock optical signal is synchronized with the target modulated optical signal.

* * * * *